(12) United States Patent
Bockmeyer et al.

(10) Patent No.: US 9,758,425 B2
(45) Date of Patent: Sep. 12, 2017

(54) SEMI-TRANSPARENT COATING MATERIAL

(75) Inventors: Matthias Bockmeyer, Mainz (DE); Andrea Anton, Hueffelsheim (DE); Vera Breier, Lismore (AU); Angelina Milanovska, Mainz (DE); Andreas Gier, Ormesheim (DE); Axel Kalleder, Neunkirchen (DE); Silke Knoche, Saulheim (DE)

(73) Assignees: SCHOTT AG, Mainz (DE); INOMAT GMBH, Neunkirchen (DE)

( * ) Notice: Subject to any disclaimer, the term of this patent is extended or adjusted under 35 U.S.C. 154(b) by 526 days.

(21) Appl. No.: 14/122,918

(22) PCT Filed: Apr. 13, 2012

(86) PCT No.: PCT/EP2012/056737
§ 371 (c)(1),
(2), (4) Date: Apr. 14, 2014

(87) PCT Pub. No.: WO2012/167977
PCT Pub. Date: Dec. 13, 2012

(65) Prior Publication Data
US 2015/0024145 A1    Jan. 22, 2015

(30) Foreign Application Priority Data

Jun. 6, 2011 (DE) .......... 10 2011 050 872

(51) Int. Cl.
| | | |
|---|---|---|
| C03C 17/30 | (2006.01) | |
| C09D 11/02 | (2014.01) | |
| C08K 3/28 | (2006.01) | |
| C08K 3/36 | (2006.01) | |
| C03C 17/00 | (2006.01) | |
| C03C 1/00 | (2006.01) | |
| C03C 17/32 | (2006.01) | |
| C09D 11/102 | (2014.01) | |

(52) U.S. Cl.
CPC ............ *C03C 17/007* (2013.01); *C03C 1/008* (2013.01); *C03C 17/001* (2013.01); *C03C 17/30* (2013.01); *C03C 17/326* (2013.01); *C08K 3/28* (2013.01); *C08K 3/36* (2013.01); *C09D 11/102* (2013.01); *C03C 2203/27* (2013.01); *C03C 2203/28* (2013.01); *C03C 2203/30* (2013.01); *C03C 2217/44* (2013.01); *C03C 2217/475* (2013.01); *C03C 2217/478* (2013.01); *C03C 2217/78* (2013.01); *C03C 2218/119* (2013.01); *Y10T 428/24997* (2015.04); *Y10T 428/31612* (2015.04)

(58) Field of Classification Search
CPC ......... B32B 7/02; C03C 17/00; C03C 17/236; C03C 17/30; C03C 2217/78; C09D 11/02; C08K 3/28; C08K 3/36
USPC .......................... 428/212, 558, 162; 523/456
See application file for complete search history.

(56) References Cited

U.S. PATENT DOCUMENTS

| | | |
|---|---|---|
| 2006/0286318 A1 | 12/2006 | De Leuw et al. |
| 2009/0128028 A1 | 5/2009 | Hildenbrand et al. |
| 2011/0045259 A1* | 2/2011 | Bockmeyer ......... H01L 51/5268 428/212 |

FOREIGN PATENT DOCUMENTS

| | | |
|---|---|---|
| EP | 0614957 A1 | 9/1994 |
| JP | 03006276 | 1/1991 |
| JP | H05163463 A | 6/1993 |
| JP | 05306339 | 11/1993 |
| JP | 2002068780 A | 3/2002 |
| JP | 5163463 B2 | 3/2013 |
| WO | 0120641 A1 | 3/2001 |
| WO | 0250191 A2 | 6/2002 |

OTHER PUBLICATIONS

English translation of International Search Report dated Aug. 6, 2012 for corresponding PCT/EP2012/056737, 3 pages.
English translation of Written Opinion of the International Searching Authority dated Aug. 6, 2012 for corresponding PCT/EP2012/056737, 9 pages.
English translation of International Preliminary Report on Patentability dated Dec. 10, 2013 for corresponding PCT/EP2012/056737, 10 pages.

* cited by examiner

Primary Examiner — Deve E Valdez
(74) Attorney, Agent, or Firm — Ohlandt, Greeley, Ruggiero & Perle, L.L.P.

(57) ABSTRACT

A semi-transparent coating material for coating glass or glass ceramics includes at least one sol-gel hybrid-polymer coating system having a hybrid-polymer or inorganic sol-gel-based matrix, and nanoparticles and nanoscale pigments and/or dyes are added to the hybrid-polymer or inorganic sol-gel-based matrix.

23 Claims, No Drawings

SEMI-TRANSPARENT COATING MATERIAL

The invention relates to a semi-transparent coating material for coating glass or glass ceramics, particularly a glass or glass-ceramic cooking surface.

Coatings on glass and glass ceramics are known from the prior art, these coatings being used, for example, in display areas in cooking surfaces and for other operating elements in household appliances.

Displays that characterize cooking zones having high temperatures by means of a red dot, for example, have been used for several decades, particularly in the area of cooking zones. These dots are not sharp in contour, since the cooking panels used have a knobby structure on the bottom that refracts the light differently. Requirements for kitchen appliances have also become greater with respect to user friendliness and information needs. Thus, the trend in recent years has been for increased use of transparent glass ceramics for cooking surfaces.

Transparent glass ceramics, however, have the disadvantage that the entire technical construction is visible underneath the cooking surface. In order to prevent viewing into the inside of the appliance, it is known to provide the glass ceramics with the most varied coatings, which shall also suffice for both technical as well as designer requirements.

In order to obtain a high opacity, in particular, coatings or colors are being developed that have a high capacity for light absorption, but at the same time also have a high scatter. In the display area, in particular, such layers with a high scatter lead to blurry, low-contrast displays.

Displays are also known that do not have such scatter. The coatings used for these are based on precious metals. In this case, organically bonded precious metals are printed onto transparent glass ceramics, and a thin film of precious metal is deposited by means of a burning-in process. This method is very expensive due to the cost of raw material for the precious metals.

In addition, there are semi-transparent organic coating systems, for example, based on polyurethane, but these only have a low scratch resistance and are resistant to temperatures only up to approximately 140° C.

Scratch-resistant, hybrid-polymer systems, on the other hand, are used as scratch-resistant coatings for plastic lenses for eyeglasses.

It is now the object of the invention to provide a coating material that makes it possible to apply onto glass or glass ceramics a semi-transparent coating that does not have scattering centers in the visible wavelength region and displays a high scratch resistance. The coating material can be introduced in a locally textured manner on the glass or the glass ceramics on one side by means of a suitable coating process. As a result, a coating can be produced that, on the one hand, is opaque enough that viewing into the inside of the appliance is prevented, but, on the other hand, is semi-transparent so that the display function appears contour-sharp and of high contrast.

On the one hand, this object of the invention is achieved by a semi-transparent coating material according to the features of the independent patent claims 1 and 20, and, on the other hand, by a method for applying the coating material according to patent claim 29. Advantageous enhancements are described in each of the subclaims.

According to a fundamental concept of the invention, the coating material has at least one sol-gel hybrid-polymer coating system with a hybrid-polymer or inorganic sol-gel-based matrix; and nanoparticles and nanoscale pigments and/or dyes, particularly organic dyes are added to the matrix. In order to increase the layer hardness and scratch resistance as well as the screen-printing behavior or the pasting, for example, non-scattering and non-absorbing or poorly-absorbing nanoparticles in the visible wavelength region are added to the hybrid-polymer matrix.

In order to obtain a high scratch resistance, the matrix can have at least one sol-gel hybrid-polymer matrix based on a selection of epoxy, methacrylate, allyl or vinyl silane. The coating materials or colors named here may have a hybrid-polymer or inorganic sol-gel-based color matrix that is provided with pigments and/or dyes. In this case, the inorganic matrix is preferably used especially for applications in the higher temperature range.

Scratch resistance is still further improved by the use of inorganic nanoparticles, preferably fiber-form $SiO_2$ nanoparticles. A sol-gel binder containing $SiO_2$ nanoparticles can be used in this case, whereby the mass ratio of sol-gel binder to nanoparticle mass can amount to 10:1 to 1:1, preferably 5:1 to 2:1.

In this way, nanoparticles can be incorporated in the sol-gel network reactively via a metal-oxide or semimetal-oxide bond.

According to one embodiment, the nanoparticles can have a globular or spherical morphology and a size between 4 and 200 nm, preferably between 10 and 150 nm.

According to a preferred embodiment, the nanoparticles can have a chain-form or fiber-form morphology, with an average length of 30 to 150 nm and an average size of 5 to 20 nm.

In this case, inorganic, oxidic, non-scattering nanoparticles, preferably $SiO_2$-based nanoparticles dispersed in a nonaqueous solvent can be used.

Since high temperatures may also arise directly in the display region in cooking surfaces as a result of erroneous operation, temperature-resistant pigments, dyes or compounds are to be used in order to avoid discolorations of the coated cooking surfaces. Here, a selection of the following compounds can be chosen as pigments: titanium nitride (TiN), titanium carbide (TiC), zirconium nitride (ZrN), zirconium carbide (ZrC), titanium carbonitride ($TiC_xN_{1-x}$), zirconium carbonitride ($ZrC_xN_{1-x}$), Si, aluminum nitride (AlN), CuO, cobalt-iron oxide, manganese-iron oxide, $NiFeO_4$, $CoZnFe_4O_8$, $CoFeO_4$, $NiZnFe_4O_8$, $Fe_2O_3$, $TiO_2$ or ZnO.

Both purely organic as well as organometallic dyes and/or metal-complex dyes can be used as organic dyes. In this case, among others, anthraquinone, copper phthalocyanin, triphenylmethane, azo dyes are utilized. In a special embodiment, dyes known to the person skilled in the art under the trade names Basacid, Basovit, Basonyl, Neozapon, Neptun, Orasol and/or Heliogen dyes are utilized. Among others, for example, the products of BASF with the following brand names can be used: Orasol 4GN, Orasol 2GLN, Orasol 2RLN, Orasol Orange G, Orasol Orange RG, Orasol Brown 2RL, Orasol Red BL, Orasol Blue GN, Orasol Black RLi, Orasol Red G, Orasol Black X45, Orasol Black X55.

In this case, a black semi-transparent coating that is based on absorbing pigments with a grain size in the nanometer range or organic dyes is particularly preferred.

The low scattering of the layers is achieved with the use of either organic or inorganic, nanoscale pigments. This can be achieved with the use of absorbing pigments having a size of 1-200 nm, preferably 5-100 nm, and more preferably 10-50 nm.

Pigments that do not scatter in the case of the wavelengths of visible light can be used in a particularly advantageous way as pigments. They can be organic or inorganic absorption pigments, for example.

Nanoparticles are used as inorganic pigments. In order to minimize the amount of scatter, pigments with grain sizes in the nanometer range are utilized. This is necessary, since pigments are not usually present in identical grain size but rather in a statistical grain-size distribution. Even when the average grain diameter is less than 200 nm, there are always a sufficient number of particles that are larger than 200 nm and thus cause scatter in the case of conventional pigments.

Also, colored inorganic nanoparticles can be utilized for non-dark or non-black color coordinates. White pigments, for example $TiO_2$ or $ZnO$, can also be applied in nanoparticle form.

For all of these pigments, the preferred size of 1-200 nm, more preferably 5-100 nm, even more preferably 10-50 nm is valid.

Due to the use of inorganic nanoparticles, preferably fiber-form, inorganic $SiO_2$ nanoparticles, the capability for screen printing and pasting can be improved so that thickeners, such as cellulose or aerosol, for example, can be wholly or partially dispensed with.

The color matrix may have a glass powder as inorganic component. An inorganic color matrix in this case may be composed of a glass powder and a medium, with which the processability and printability can be adjusted.

Inorganic or hybrid-polymer sol-gel compounds, preferably hydrolyzed epoxy, methacrylate, amino, mercapto, allyl, vinyl, alkoxy silanes and mixtures thereof can be used as binders.

Additionally, the sol-gel matrix may contain components of polyurethane resins, organically or inorganically crosslinking silicones, silicone resins, siloxanes, polysiloxanes, organic acrylate-based systems, preferably methacrylates, epoxides, polyamides, polyimide and mixtures thereof.

The binder may have molecularly dispersed, colloidally dispersed or hybrid-polymer sol-gel precursors selected from silicon, titanium, zirconium, aluminum, zinc, magnesium, calcium, or tin.

The hardenable hybrid polymer can have glycidyloxypropyl triethoxysilane, glycidyloxypropyl trimethoxysilane, vinyl triethoxysilane, allyl triethoxysilane, methacryloxypropyl trimethoxysilane, methacryloxypropyl triethoxysilane or a similar hydrolyzed alkoxysilane precursor having one or more UV-crosslinkable or thermally crosslinkable organic functional group(s).

Preferably, nanoparticles are used, which are combined with a binder having a degree of condensation of more than 60%. In this case, the volume fraction of nanoparticles is preferably greater than 50%.

These binders can be used with and without nanoparticles.

The hybrid-polymer precursor can be converted with a tetra-alkoxysilane in a hydrolysis and condensation reaction in the presence of $H_2O$. Preferably, the condensation reaction is conducted in this case at a pH of 5-1, preferably 3-1. Here, HCl or para-toluenesulfonic acid can be used as an acid.

Tetraethoxysilane can be used as the tetraalkoxysilane. The preferred monomer ratio of hybrid-polymer silane to tetraethoxysilane is 2:1-5:1, preferably 4:1. The degree of crosslinking of silane is preferably >80%, more preferably >85%. The degree of crosslinking can be determined in this case via 29 Si-NMR.

In order to assure the capability for screen printing, after the condensation and hydrolysis reaction, the readily volatile solvent can be removed in a rotary evaporator. The so-named hydrolysate is obtained in this way. This precursor or the hydrolysate can be used as the binder for nanoparticles, in particular oxidic, amorphous or crystalline nanoparticles, particularly $SiO_2$ nanoparticles.

High-boiling solvents with a low vapor pressure of <1 bar, preferably<0.2 bar, more preferably<0.1 bar, can be used as solvent. For example, this is a solvent such as terpineol, n-butyl acetate, carbitol, carbitol acetate, ethylene glycol monoethyl ether, diethylene glycol monoethyl ether, and tripropylene cycol monomethyl ether and mixtures thereof.

In particular, a color matrix suitable for screen printing may require a high-boiling solvent with a vapor pressure of <5 hPa, preferably<2 hPa, more preferably<1 hPa.

In order to increase the scratch resistance, bis-epoxide, bis-methacrylate, or similar organic hardeners or crosslinkers having several organic crosslinkable groups can be added to the coating material.

The molar ratio of crosslinkable organic monomer to monomer of the hardener or crosslinker used can be 35:1-10:1, preferably 25:1-15:1. The hardener or crosslinker in this case can be 3,4-epoxycyclohexane carboxylate or dimethylene bis-acrylamide.

In order to initiate the crosslinking reaction of the organic functional groups, activatable initiators can be added to the coating solution. These may be aluminum acetylacetonate or methylimidazole, for example.

UV-activatable initiators such as iodonium, (4-methylphenyl)[4-(2-methylpropyl)phenyl]-, hexafluorophosphate (1-), Irgacure 186, for example, may also be added to the coating solution.

In a special embodiment according to the invention, adhesion promoters can be added to the coating. These can be amino and/or mercapto silanes, for example. For example, these may be 3-aminopropyl triethoxysilane or 3-mercaptopropyl trimethoxysilane. The fraction of adhesion promoter silanes can be between 1:30 and 1:10, preferably 1:20 and 1:15, with respect to the other alkoxy silanes in this case.

Depending on the coating method employed in each case, different leveling agents, anti-foaming agents or deaerators, for example, PEG, BYK 302, BYK 306 or Airex 931, can also be added in order to achieve homogeneous layer thicknesses of the coating.

According to yet another fundamental concept of the invention, the coating material is produced as a screen-printable 2-component coating based on hybrid polymers made of a mixture of a first and a second component mixture, the first component mixture having the hybrid polymer and the second component mixture having nanoparticles in a high-boiling solvent. The nanoscale pigments or organic dyes in this case can be added to both the first as well as the second component.

Screen-printable 2-component coatings based on epoxy silanes are particularly preferred for use. In this case, the first component mixture may have an essentially solvent-free mixture of epoxy silane and tetraethoxysilane and the second component mixture may have chain-form $SiO_2$ nanoparticles, which can be dispersed in tripropylene cycol monomethyl ether or diethylene glycol monoethyl ether.

The chain-form or/and fiber-form $SiO_2$ nanoparticles in this case preferably have a diameter between 6 and 30 nm, more preferably a diameter of 8 to 20 nm, and a length of 50 to 200 nm, preferably a length of 60 to 150 nm. The use of fiber-form and/or chain-form nanoparticles in this case brings about a particularly good capability for screen printing of the coating and particularly good leveling properties of the layers. For example, no holes or other defects which arise based on poor coating properties are observed.

An aqueous solution of pH 2 containing an initiator, in particular para-toluenesulfonic acid, can be added to the first component mixture.

A crosslinker, preferably 3,4-epoxycyclohexane carboxylate, and a leveling agent or deaerator can be added to the second component mixture.

In a special embodiment according to the invention, a pigment is preferably dispersed in one of the two component mixtures or an organic dye can be dissolved in one of the two component mixtures, whereby the pigment can be TiN. The TiN can be present, in particular, in a primary particle size of 25 nm.

For example, the organic black dye Orasol LR4 can be utilized as organic dye.

By means of mixing the two components, one obtains a screen-printing coating that, in the case of TiN, can be dried and hardened at temperatures of up to 375° C., preferably at temperatures of 120° C.-180° C.

When using the organic dye, the coating can be dried and hardened at temperatures of less than 250° C., preferably less than 230° C., most preferably between 180 and 140° C.

If the drying temperature lies below the decomposition temperature of the organically crosslinkable functionality, for example, the epoxy group, then preferably a degree of crosslinking of the organic functionalities of 50-90%, preferably 60-80% is achieved. The degree of organic crosslinking in this case can be determined by the method of Raman spectroscopy, which is known to the person skilled in the art.

In another embodiment according to the invention, the hardening of the organic layer can also be carried out with the use of a UV source. A degree of organic crosslinking in the layer of >50%, preferably>60%, is likewise preferably achieved.

Due to the large fraction of Si and optionally inorganic pigments, the mass loss of a special coating according to the invention above a pyrolysis temperature of 600° C., is between 20 and 60 mass %, preferably between 50 and 30 mass %, which is determined, for example, by thermogravimetry with a heating rate of 10 Kelvin per min.

The viscosity of the screen-printable coatings according to the invention preferably lies at 500 mPa*s to 3000 mPa*s, more preferably 700 to 1500 mPa*s.

The transmittance of the coating material or the coating produced according to the invention in the visible wavelength region can lie between 2 and 15%, preferably between 3 and 12%.

The coating material can be applied by a printing method. This printing method can be an ink-jet printing method, an offset printing method, a pad printing method, a roll-coating method, a dipping method, a spin-coating method, or a spraying method.

According to a preferred embodiment, the printing method can be a screen-printing method.

The viscosity of the color matrix, particularly the thixotropic behavior for the screen-printing method, can be adapted to the selected printing method via the solvent content, the content of nanoparticles, or the surface and morphology of the nanoparticles employed, prior to printing.

In addition, the viscosity of the color matrix can be adapted to the selected printing method prior to printing by addition of aerosils, as well as $SiO_x$ or $Al_xO_y$ particles that are produced by flame pyrolysis or by the precipitation process, cellulose compounds, polyvinylpyrrolidone, polyethylene glycol, or block copolymers, or similar organic thickeners.

After coating, the color layers can be thermally hardened or UV-hardened. In this way, in the case of employing inorganic, ceramic colors, the coating can be burned in after printing at temperatures of >500° C., preferably>700° C.

In contrast, in the case of employing organic pigments, after printing, the coating can be hardened by UV or thermally at temperatures of <200° C.

According to a preferred embodiment, the coating can be applied using screen printing by means of a 140-mesh screen.

The invention will be explained in more detail below on the basis of embodiment examples.

Embodiment Example 1

Preparation of Component 1:

0.08 mole of GPTES (glycidyloxypropyl triethoxysilane) with 0.02 mole of TEOS (tetraethoxysilane) is hydrolyzed with water mixed with 0.125 mole of para-toluene acid. Subsequently, the solvent is removed in a rotary evaporator and 22.6 g of binder are obtained. 0.5 g of methylimidazole is added to this solution.

Preparation of Component 2:

A 40 mass % dispersion of 15-nm chain-form $SiO_2$ particles in tripropylene glycol monomethyl ether is used as the solution containing nanoparticles.

1.0 g of 3,4-epoxycyclohexane carboxylate, 5 g of TiN with a primary particle size of 25 nm, 0.4 g of Airex 931, and 0.2 g of BYK 302 are added to 20 g of this solution.

After combining components 1 and 2, a 5-pm thick layer is applied onto transparent glass ceramics by means of screen printing using a 140-mesh screen. The color is burned in for 30 min at 180° C.

Embodiment Example 2

Instead of the pigment TiN employed in Embodiment Example 1, 3.2 g of Orasol RLI are added to the solution in Embodiment Example 2.

Embodiment Example 3

25 mass % of cobalt-iron spinel is added to a glass flow and mixed with screen-printing oil, whereby the grain size is 20-100 nm. The mixture is homogenized in a 3-roll mill and subsequently printed onto transparent glass ceramics by screen printing. The colors are burned in at 800° C. for 1 hour.

An image that is sharp in contour and rich in contrast when viewing is obtained with an LED seven-segment display disposed on glass ceramics coated with coatings according to Embodiment Examples 1 to 3.

Embodiment Example 4

Preparation of Component 1:

A 38 mass % dispersion of chain-form $SiO_2$ particles (15-nm primary particle size with a chain length von 50-150 nm) in diethylene glycol monoethyl ether (DEGMEE) is used as the solution containing nanoparticles.

1.4 g of (3,4-epoxycyclomethyl) 3,4-epoxycyclohexane carboxylate, 4.0 g of dye Orasol RLI and 0.6 g of 1,5 - diazobicyclo[4.3.0]none-5-ene are added to 27 g of this solution.

Component 1 is stirred for 12 h.

Preparation of Component 2:

0.08 mole of GPTES (glycidyloxypropyl triethoxysilane) with 0.02 mole of TEOS (tetraethoxysilane) is hydrolyzed with water mixed with 0.018 mole of para-toluene acid. Subsequently, the solvent is removed in a rotary evaporator and 23.0 g of binder are obtained.

After combining components 1 and 2, an approximately 5-μm thick layer is applied onto lithium alumosilicate (LAS) transparent glass ceramics by means of screen printing using a 140-mesh screen. The color is burned in for 1 h at 170° C.

The invention claimed is:

1. A semi-transparent coating material for coating glass or glass ceramics comprising:
   at least one sol-gel hybrid-polymer coating system having a hybrid-polymer or inorganic sol-gel-based matrix;
   nanoparticles and nanoscale pigments and/or dyes are added to the hybrid-polymer or inorganic sol-gel-based matrix, wherein the nanoscale pigments are selected from the group consisting of titanium nitride (TiN), titanium carbide (TiC), zirconium nitride (ZrN), zirconium carbide (ZrC), cobalt-iron oxide, manganese-iron oxide, $NiFeO_4$, $CoZnFe_4O_8$, $CoFeO_4$, $NiZnFe_4O_8$, $Fe_2O_3$, and ZnO; and
   a crosslinkable organic monomer and a monomer of a hardener or crosslinker that have a molar ratio of 35:1-10:1.

2. The coating material according to claim 1, wherein the hybrid-polymer or inorganic sol-gel-based matrix has at least one sol-gel hybrid-polymer matrix selected from the group consisting of epoxy, methacrylate, allyl and vinyl silane.

3. The coating material according to claim 1, further comprising a sol-gel binder having $SiO_2$ nanoparticles, whereby the mass ratio of sol-gel binder to a mass of nanoparticle amounts to 10:1 to 1:1.

4. The coating material according to claim 1, wherein the nanoparticles are incorporated in the sol-gel hybrid-polymer coating system reactively via a metal-oxide or semimetal-oxide bond.

5. The coating material according to claim 1, wherein the nanoparticles have a globular or spherical morphology and a size between 4 and 200 nm.

6. The coating material according to claim 1, wherein the nanoparticles have a chain-form or fiber-form morphology, with an average length of 50 to 150 nm and an average size of 5 to 25 nm.

7. The coating material according to claim 1, wherein the nanoscale pigments have a size of 1-200 nm.

8. The coating material according to claim 1, further comprising a color matrix that has a glass powder as an inorganic component.

9. The coating material according to claim 1, further comprising inorganic or hybrid-polymer sol-gel compounds as binder.

10. The coating material according to claim 1, wherein the hybrid-polymer or inorganic sol-gel-based matrix has components selected from the group consisting of polyurethane resins, organically or inorganically crosslinking silicones, polysiloxanes, organic acrylate-based systems, methacrylates, epoxides, polyamides, polyimide, and combinations thereof.

11. The coating material according to claim 9, wherein the binder has molecularly dispersed, colloidally dispersed or hybrid-polymer sol-gel precursors selected from the group consisting of silicon, titanium, zirconium, aluminum, zinc, magnesium, calcium, and tin.

12. The coating material according to claim 1, further comprising a hardenable hybrid polymer that is selected from the group consisting of glycidyloxypropyl triethoxysilane, glycidyloxypropyl trimethoxysilane, vinyl triethoxysilane, allyl triethoxysilane, methacryloxypropyl trimethoxysilane, methacryloxypropyl triethoxysilane, a hydrolyzed alkoxy silane precursor containing one or more UV-hardenable, and thermally crosslinkable organic functional groups.

13. The coating material according to claim 1, wherein the nanoparticles coupled with a binder have a volume fraction that is greater than 50%.

14. The coating material according to claims 1, further comprising bis-epoxide, bis-methacrylate or organic hardeners or crosslinkers having organic crosslinkable groups.

15. The coating material according to claim 1, wherein the hardener or crosslinker is 3,4-epoxycyclohexane carboxylate.

16. The coating material according to claim 1, further comprising aluminum acetylacetonate, methylimidazole or thermally activatable initiators.

17. The coating material according to claim 1, further comprising iodonium, (4-methylphenyl)[4-(2-methylpropyl)phenyl(-1)hexafluorophosphate, and a UV-activatable initiator.

18. A semi-transparent coating material for coating glass or glass ceramics comprising:
   a mixture of a first component mixture and a second component mixture as a screen-printable 2-component coating based on hybrid polymer, whereby the first component mixture has the hybrid polymer and the second component mixture has nanoparticles, and the first and/or the second component mixture has nanoscale pigments and/or dyes, wherein the nanoscale pigments comprise TiN or organic black pigment; and
   a crosslinkable organic monomer and a monomer of a hardener or crosslinker that have a molar ratio of 35:1-10:1.

19. The coating material according to claim 18, wherein the first component mixture has an essentially solvent-free mixture of epoxy silane and tetraethoxysilane and in that the second component mixture has chain-form $SiO_2$ nanoparticles.

20. The coating material according to claim 18, further comprising uenesulfonic acid, that is added to the first component mixture for preliminary crosslinking.

21. The coating material according to claim 19, wherein the chain-form $SiO_2$ nanoparticles are dispersed in tripropylene glycol monomethyl ether.

22. The coating material according to claim 18, further comprising a crosslinker and a leveling agent or deaerator that are added to the second component mixture.

23. The coating material according to claim 18, wherein the semi-transparent coating has a transmittance in the visible wavelength region between 2 and 15%.

* * * * *